United States Patent Office 3,361,636
Patented Jan. 2, 1968

3,361,636
NUCLEAR REACTOR WITH SOLID SUBSTANCE MODERATOR OF VARIABLE SLOWING-DOWN POWER
Erich Rudolf Bagge, Kiel, Germany, assignor to Rolf Schlottau, Kiel-Wik, Germany
No Drawing. Filed Sept. 16, 1965, Ser. No. 488,836
Claims priority, application Germany, Sept. 17, 1964, Sch 35,790
1 Claim. (Cl. 176—42)

For improving the economic utilization of the fuel in nuclear reactors efforts are made in today's nuclear engineering to obtain as high a fuel burn-up as possible. There are different approaches to achieve this end, but all of them follow the principle of providing the reactor with a sufficient reactivity reserve upon the commencement of its operation. This built-in reactivity is compensated during the initial period by added absorbers and released only when the reactivity of the reactor is decreasing by the burn-up and the fission products which are being formed. A method largely applied today for achieving this end consists in adding to the reactor core a burnable poison which vanishes in the course of reactor operation and thus creates a reactivity increase.

Another possibility is given by modifying the moderation and adsorption properties of the moderator in the reactor during operation. To this end the so-called special shift reactor, e.g., employs a mixture of light and heavy water as moderator and coolant, possibly also as moderator only, the relative composition of which is modified in the cause of reactor operation. In this particular reactor type of Babcock and Wilcox Limited, America, the $D_2O$ concentrations are raised, in the course of reactor operation, from 20 to 80 percent in the light/heavy water mixture; this is similar to what has been taken into consideration for the Anglo-Belgian Vulcain reactor project.

The great advantage involved in such an operation method of power reactors is to be seen in the fact that the moderation properties can be modified continuously and uniformly across the whole reactor core and, therefore, can for a major period of time be brought in line with the actual reactor operating conditions. In this way the reactor core is utilized for power production in an almost equal manner throughout its inside during the full operating period. Heavy buckling by inserted control rods and, consequently, very uneven distribution of the power density in the reactor can therefore be avoided.

A disadvantage of this method is the necessity of modifying continuously the isotope compositions of the moderator during operation. In principle this can be done, it is true, by adding a high-percentage grade of $D_2O$ stepwise or continuously to the moderator during operation. But this should be a very expensive method. The moderator liquid will rather be concentrated to higher $D_2O$ contents continuously through an isotope separator connected in parallel with the reactor and only as much reserve liquid will be added as is necessary for maintaining the moderator volume in the reactor.

The construction and operation of the isotope enrichment plant by the side of the reactor will increase the costs of the total equipment, thus absorbing at least partially the economic gain achieved by increasing the burn-up of the fuel.

From the technical point of view an isotope separator added to the reactor makes operation more difficult, because such a plant creates new sources of troubles and needs additional maintenance. It is, therefore, a logical consequence to look for methods which avoid the necessity of having the isotope composition of the moderator modified by own separators during reactor operation.

During the last few years developments have been made which aim at building up hydrogen moderated research and power reactors in which the hydrogen atoms acting as moderators are chemically combined, e.g. in zirconium hydride. In such a case the zirconium hydride moderator constitutes, e.g. in the form of rods or tubes, a skeleton between which the fuel rods are introduced. The number of the hydrogen nuclei per unit of volume may, depending upon the hydrogen concentration, even be higher than in natural water so that the slowing down of the fast neutrons will take place in closer vicinity of the fission core than is the case in the water moderated reactor. When such a reactor is built up so as to ensure that the skeleton of the moderator rods can be modified conveniently either during reactor operation or during any outage time, it will e.g. be possible to interchange moderator rods of different hydrogen concentrations and to initiate in this way reactivity variations.

As, on the other hand, there is chemically no difference between light and heavy hydrogen and zirconium deuteride can be made as easily as zirconium hydride, there are in principle no difficulties in the way of utilizing in the same reactor zirconium deuteride rods instead of the zirconium hydride moderator rods originally existing.

The object of the present invention is to modify the moderator properties in a nuclear reactor during operation or during outage time discontinuously or almost continuously by substituting zirconium deuteride rods for zirconium hydride rods in accordance with the modifying reactivity requirements of the reactor. To this end it is not necessary that the rods of the one grade contain only zirconium and pure hydrogen alone or that the rods of the other grade contain only zirconium and pure deuterium alone. It will rather be appropriate to bind right from the beginning a hydrogen-deuterium mixture of determinable composition to the zirconium. It will e.g. be possible to make moderator rods in which, in a manner similar to the spectral shift reactor, a hydrogen-deuterium mixture of e.g. 20 percent hydrogen and 80 percent deuterium will be utilized. Furthermore, another stock of rods will be created in which this ratio is e.g. 80 percent hydrogen and 20 percent deuterium. By appropriate distribution and application in the reactor it is possible to obtain from both rod stocks almost continuously any desired hydrogen/deuterium ratio throughout the core, ratio which is defined by the limit compositions as indicated, by way of example, for the two moderator rod grades. For applying this method of modifying the reactivity of a reactor it is unimportant when besides the solid substance moderator there is also a liquid moderator or a coolant with moderator properties, e.g. ordinary water.

When, moreover, not only two grades of such zirconium-hydro-deuteride rods at a certain relative concentration of hydrogen and deuterium are taken, but possibly several series of rods among which also such with pure hydrogen and pure deuterium, it is in principle possible to establish throughout the life of a core load any desired hydrogen-deuterium mixture ratio across the reactor by substituting rods of another deuterium concentration for those of one deuterium concentration. This allows continuous adaptation to the reactivity conditions given in the reactor by burn-up and fission product poisoning. It is also possible to substitute the one for the other grade of moderator rods only in partial areas or zones of the reactor.

It must similarly be pointed out that in this connection there is also another possibility of influencing the reactivity of the reactor, possibility which, under certain circumstances, may be necessary or appropriate for smoothing the flux course in the reactor with solid substance moderation. It is, e.g., possible to replace individual or part of the removable control rods containing the zirconium-hydro-deuteride mixture by canned or uncanned rods which contain graphite or beryllium or beryllium oxide, moderate less than the zirconium-hydro-deuteride rods and influence, on the other hand, the neutron flux distribution by other absorption properties or neutron porducing capabilities.

I claim:

1. A method of operating a nuclear reactor of the variable moderator type comprising moderating said reactor with removable solid moderator materials having a predetermined ratio of zirconium deuteride to zirconium hydride and changing the moderation capacity of said moderator reactor by replacing at least a portion of removable moderator materials with replacement solid moderator materials consisting of shaped bodies of zirconium deuteride and of zirconium hydride each being replaced by other similiarly shaped bodies of zirconium deuteride and zirconium hydride, each having a different moderation capacity than the body replaced by it, whereby during the operating life of said variable moderator reactor the reactivity thereof is modified as required by the consumption of fissionable material.

References Cited

UNITED STATES PATENTS

| | | | |
|---|---|---|---|
| 3,105,036 | 9/1963 | Puechl | 176—42 |
| 3,142,624 | 7/1964 | Edlund | 176—42 X |
| 3,150,052 | 9/1964 | Stoker et al. | 176—42 X |
| 3,164,525 | 1/1965 | Wetch et al. | 176—42 X |
| 3,218,236 | 11/1965 | Tollet | 176—84 X |
| 3,219,540 | 11/1965 | Costes | 176—84 |

FOREIGN PATENTS

| | | |
|---|---|---|
| 963,161 | 7/1964 | Great Britain. |
| 1,308,382 | 9/1962 | France. |

REUBEN EPSTEIN, *Primary Examiner.*